INVENTOR
JOSEPH B. WALKER

BY
Westall & Westall
ATTORNEYS

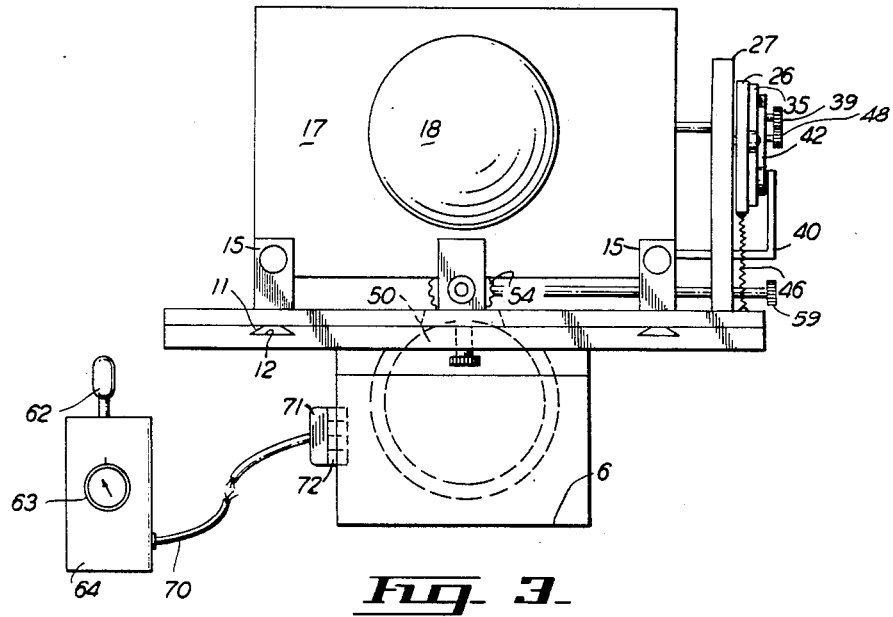
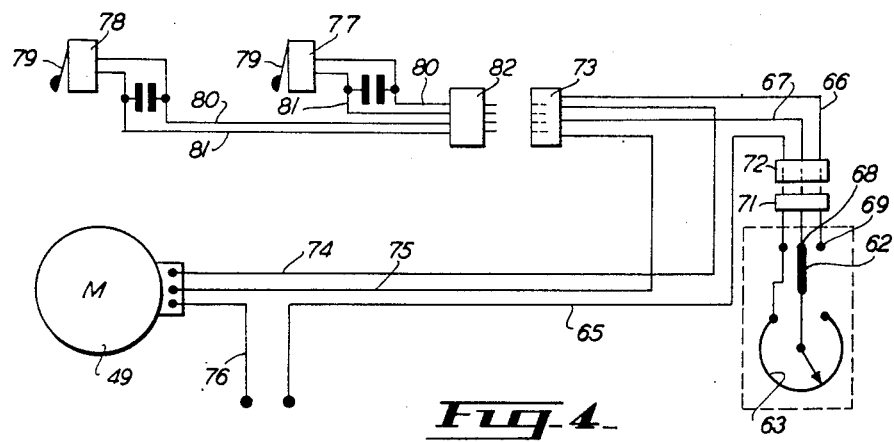

Patented Dec. 5, 1950

2,532,685

UNITED STATES PATENT OFFICE 2,532,685

LENS ADJUSTING MECHANISM

Joseph B. Walker, Hollywood, Calif.

Application July 23, 1949, Serial No. 106,435

9 Claims. (Cl. 88—57)

This invention relates to lens adjusting mechanisms embodying means for variably determining the adjustment of components of a lens system relative to one another. This application constitutes a continuation-in-part of my co-pending applications, S. N. 791,897, filed December 15, 1947, now Patent No. 2,506,947, dated May 9, 1950, S. N. 32,160, filed June 10, 1948, S. N. 72,508, filed January 24, 1949, and S. N. 88,350, filed April 19, 1949, now Patent No. 2,515,104, dated July 11, 1950.

As is taught in the prior art, a progressively-magnified image of a photographic subject may be obtained by manually shifting one lens element or combination of a composite lens system relative to the focal plane, the initial pre-determined critical focusing of the system being maintained by corresponding synchronous adjustment of another lens element or combination of the system. However, the required compensatory adjustment of components of the system in order to avoid focusing maladjustment incident to such magnification of the image varies with the object distance as well as with the movement of the primary lens. In my co-pending applications above-identified, I have disclosed lens systems wherein a primary lens is moved manually to any desired extent and at any velocity in order to obtain the required degree of magnification in any pre-determined period. Focusing compensation is accomplished through cam mechanism pre-set for any desired object distance to induce, synchronously, with the velocity of movement of the primary lens, the required degree of movement of a secondary lens.

While the successful application and utility of such mechanism to television cameras has been established, manual manipulation of the primary lens is sometimes difficult due to the size of such cameras and the necessary pre-occupation of the photographer to the principal task of following the action of the photographic subject.

It is accordingly, a principal object of the present invention to provide a lens adjusting apparatus of a character referred to which embodies an electrically-controlled mechanism for shifting the primary lens and, through a cam device, correspondingly adjusting the secondary lens system in order to maintain the focus.

More specifically, an object hereof is to provide a lens system adapted for utility in conjunction with television cameras, which embodying a motor for shifting one of two lens elements, slidably supported for coaxial movement, toward and away from the focal plane of the camera to vary the magnification of the image of the photographic subject, in combination with cam mechanism for coincidentally shifting the other of said lens elements to compensate for focal maladjustment incident to movement of the first-named lens.

Still another object of my invention is the provision of apparatus of the type referred to incorporating control mechanism by which the lens elements may be shifted to any part of their range of movement at a constant or progressively changing velocity and the direction of their movement reversed at will in response to actuation of a control adapted for disposition adjacent the back of the camera for most facile manipulation by the photographer.

Another object is to provide switch mechanism actuated by the lens carriers for mechanically cutting off the power to the motor when the movable lens elements reach either end of their range of movement.

Another object is to provide a releasable drive connection between the power means and lens carriers which permits operative disengagement of the motor so as to enable manual adjustment of the primary lens when desired.

Other objects include instantaneous control of the magnification of the image with maximum facility, and ease of adjustment of the mechanism to adapt the assembly to lens elements of different optical characteristics as well as simplicity of adjustment of the angular disposition of the cam to compensate for variations in object distance.

The above and numerous other objects will be apparent to those of skill in the art upon an examination of the following description read in the light of the accompanying drawings, in which:

Fig. 3 is a front elevation of the apparatus; and

Fig. 4 is a wiring diagram of the control mechanism for the system.

Figure 1:
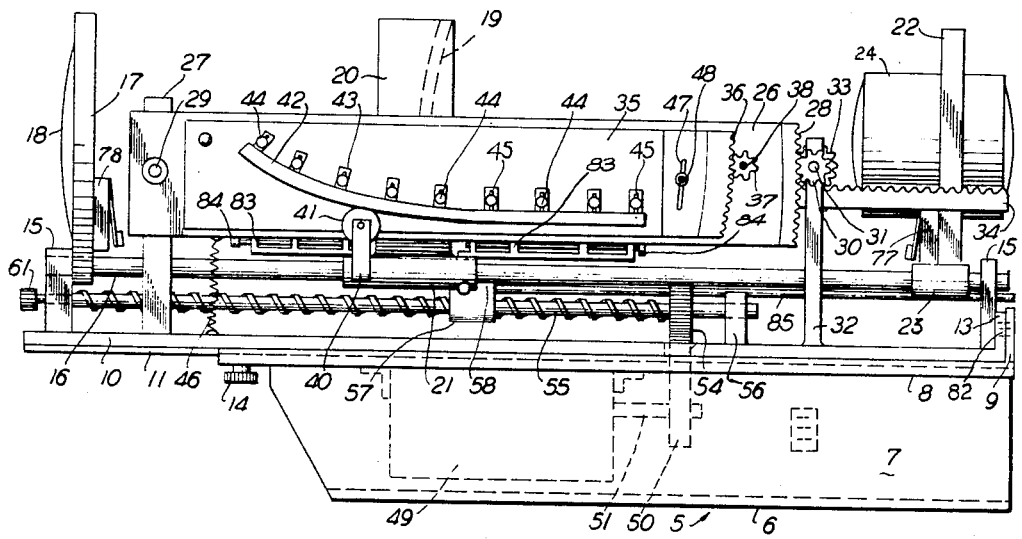
Fig. 1 is a side elevation of a lens system embodying my invention.
Figure 2:
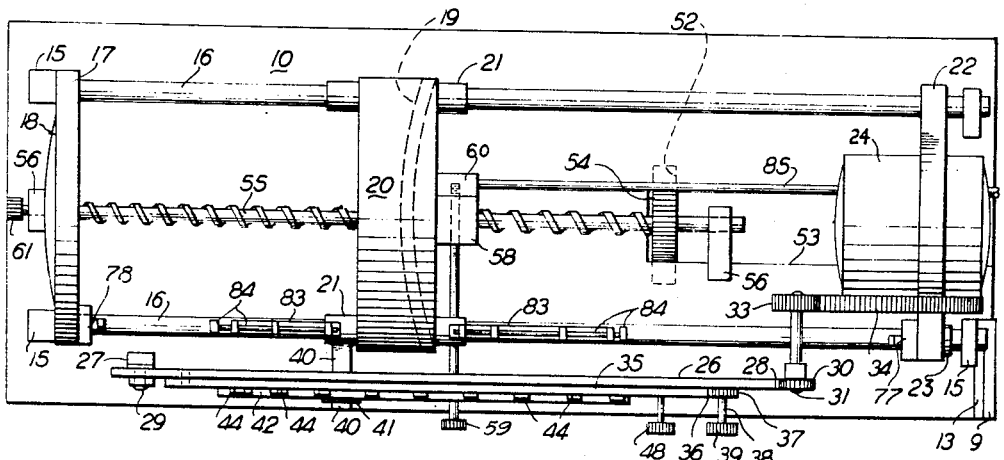
Fig. 2 is a top plan view of the assembly illustrated in Fig. 1.

Referring to the drawings more in detail, the numerals of which indicate similar parts throughout the several views, 5 designates generally an elongated box frame comprising a bottom 6, sides 7 and a top plate 8 having an upstanding stop lug 9, integral with one end. The frame 5 is adapted for permanent attachment to the supporting structure of a motion picture or television camera so as to afford support for the lens system and actuating mechanism therefor, about to be described. The lens assembly is mounted upon a base 10, the underside of which carries a pair of elongated dove-tail ribs 11 which are slidably engageable with complementary grooves 12 formed in the top plate 8 of the box frame whereby the base 10 may be slid rearwardly across the top plate with the dove-tailed ribs 11 engaged in the respective grooves 12. This motion is limited by the abutment of an upstanding lug 13 carried by the rearward end of the base 10 against the lug 9 of the plate 8. A thumb screw 14 carried by the outer end of the top plate is adapted to be threaded upwardly into locking engagement with the base 10 when the lugs 9 and 13 are in contact, so as to coact with the ribs 11 in fixing the critical operative relationship of the base and plate.

Adjacent each end of the base 10 is a pair of laterally spaced blocks 15 in which the ends of a pair of lens supporting guide rods 16 are mounted. The blocks 15 support the rods above the base in spaced relationship, parallel to but at opposite sides of a vertical plane coincident with the optical axis of the camera. Mounted rigidly upon the rods 16 contiguous with the forward pair of blocks 15 is a stationary lens mount 17 in which a lens element 18 is fitted. A primary adjusting lens 19 is similarly mounted within a carrier 20 having integral therewith a pair of sleeves 21 which are slidable upon the rods 16, respectively, rearwardly of the lens 18. Also slidable upon the rods 16 is the third or secondary adjusting lens assembly comprising a carrier 22 having integral sleeves 23 encircling the rods and a tubular lens mounting 24, suitably supported within the carrier. All lenses are thus maintained in coaxial relationship, with the primary and secondary lens assemblies movable relative to the stationary lens 18 and focal plane as well as relative to one another.

In order to compensate for the movement of the primary lens 19, which tends to disrupt the initial focus, the secondary lens carrier 22 is shifted synchronously in direct response to the movement of the primary lens. The mechanism for inducing compensatory movement of the secondary lens carrier 22 comprises a flat bar 26 disposed laterally of the line of movement of the lens carriers 20 and 22 and having its forward end pivoted to a post 27 mounted upon the base 10 adjacent but laterally of the forward lens mount 17. The opposite or rearward end of the bar 26 carries a rack 28, defining a vertical arc having its center on the point of pivoting 29 of the bar 26 to the post 27. The rack 28 is in mesh with a pinion 30, keyed to a shaft 31 journalled in a post 32 mounted upon the base 10. The shaft 31 extends inwardly and carries on its inner end a second pinion 33 which is in mesh with a straight rack 34 secured in parallel relationship with the base to the side of the secondary lens carrier 22 whereby pivotal movement of the bar 26 is transmitted through the pinions 30 and 33 to the rack 34 so as to compel axial movement in one direction or the other of the secondary lens carrier 22. One end of a cam plate 35 is pivoted to the side of the bar 26 at a point adjacent the forward end of the latter, the opposite end of the plate carrying an arcuate gear rack 36. A pinion 37 mounted upon a shaft 38 journalled in the bar is in mesh with the rack 36. The outer end of the shaft 38 is equipped with a knob 39 by which the pinion 37 may be rotated so as to pivotally raise and lower the adjacent end of the cam plate 35 relative to the bar 26.

Projecting laterally beneath the bar and cam plate 35 from the sleeve 21 of the primary lens carrier 20 nearest adjacent the bar, is an angular bracket 40, the outer upstanding section of which carries a roller 41 comprising a cam follower. The roller is rotatably supported in the bracket 40 adjacent the outer surface of the cam plate 35 for operative engagement with the underside of a flexible cam 42 attached to the face of the plate 35. A series of flat, slotted lugs 43 are secured by suitable means along the length of the cam 42 in equi-spaced relationship whereby a series of thumb screws 44, extending through the slots 45 in the lugs 43 and threaded into the cam plate 35 are effective to clamp the cam to the plate. With the screws 44 loosened, the contour of the cam may be changed within the limits permitted by the lengths of the slots 45, for a purpose hereinafter described. A helical spring 46 interposed between the bar 26 and base 10 functions to normally hold the cam 42 and its roller follower 41 in operative contiguous relationship.

It will be appreciated that when the primary lens carrier 20 is moved along the rods 16 the cam plate 35 will be raised or lowered in accordance with the contour of the cam 42. In order to transmit the movement of the cam plate 35 to the bar 26 the rearward end of the plate is formed with a slot 47 defining an arc having its center on the pivot of the plate to the bar. A locking screw 48 extending through the slot 47 and threaded into the bar locks the cam plate 35 and bar together in any relationship permitted by the length of the slot.

The primary lens carrier 20 is normally moved in response to the power of a reversible electric motor 49 suspended from the underside of the top 8 of the box frame 5. An upper arc of a driving gear 50, carried by the motor shaft 51, projects through a slot 52 in the top of the frame 5 and through an elongated opening 53 in the base 10 so as to mesh with a gear 54 carried by a worm shaft 55, journalled in blocks 56 mounted upon the base 10. The shaft 55 is preferably disposed parallel to and below the optical axis. An internally-threaded member 57 encircling the worm 55 is formed with an upward projection 58 adapted to be secured by a thumb screw 59 to a block 60 depending from, and integral with, the underside of the primary lens carrier 20. With the member 57 and block 60 secured together by the thumb screw 59, rotation of the worm shaft 55 in response to energization of the motor 49 is operable to thread the member 57 along the shaft and correspondingly move the primary lens carrier 20.

It will be appreciated that the elongated opening 53 in the base 10 through which the gear 50 extends permits withdrawal of the base and mechanism supported thereby from the box frame without disengagement of the gears 50 and 54 from their respective shafts. In order to facilitate the meshing of the gears when the base is slid onto the top 8 of the supporting frame, the forward diametrically-reduced end of the worm shaft 55 is extended through the front block 56 in which it is journalled and is fitted with a knob 61 by which the shaft may be manually turned as the gears are moved into registry.

The motor 49 is controlled by a manually operable double throw switch 62 and rheostat 63 mounted in a suitable casing 64 adapted for disposition in back of the camera. Accordingly, wires 65, 66 and 67 connected to the rheostat 63 and each of the poles 68 and 69 of the switch 62 are encased in the cable 70, terminating in a plug 71 adapted for engagement with a receptacle 72 mounted in one side 7 of the box frame structure. Through the plug 71 the wire 65 is connected to a source of electrical energy while the wires 66 and 67 of the switch 62 are connected to terminals of a receptacle 73, carried by the upstanding lug 9 at the rear of the top plate 8 of the frame. Also connected to the receptacle 73 are leads 74 and 75 from the respective windings of the reversible motor 49, the third lead 76 from the motor being connected to a source of electricity.

Arranged in the respective circuits, each of which includes one of the windings of the motor 49, one of the leads 74 or 75 and one of the poles 68 or 69 of the switch, are a pair of mechanically-operated switches 77 and 78 of conventional type carried by the secondary lens carrier 22 and stationary lens mounting 17, respectively. Each switch 77 and 78 is normally closed but includes a switch arm 79 extending into the path of movement of a dual actuating device, hereinafter described, mounted upon the primary lens carrier 20 whereby abutment of the actuating device thereagainst is effective to open the switch. As seen in Fig. 1 the leads 80 and 81 from each of switches 77 and 78 are connected to a plug 82, mounted in the upstanding lug 13 of the base 10 so as to engage in the receptacle 73, incident to assembly of the lens system and base 10 with the box frame 5. It will be understood that the leads 80 and 81 of the switch 77 are connected through the plug 82 and receptacle 73 in series with the switch 62 and the motor lead 74, the closing of the switch to complete that circuit rotates the motor shaft 51 and worm 55 in directions effective to move the primary lens carrier 20 rearwardly. This movement continues until the actuating device of the primary lens carrier abuts against the arm 79 of the switch and thus opens the circuit. By closing the other circuit through the switch 78 and the other winding of the motor 49, incident to throwing the switch 62, the motor is again energized to move the lens carrier 20 forwardly which immediately again closes the switch 77. The circuit controlled by the last-named switch 77 will remain open, however, due to the opening of that circuit by the previous throwing of the switch 62. The forward movement of the primary lens carrier 20 will, in a similar manner be halted upon opening of the circuit through the motor incident to abutment of the actuating device of the carrier against the forwardly disposed switch 78.

With the switch 62 and rheostat 63 located in the back of the camera facile control of the magnification of the image is possible. By adjustment of the rheostat 63 different velocities of movement of the primary lens 19 may be obtained. The direction of movement of the lens may be changed at any stage of its range of movement by merely throwing the switch 62.

The dual actuating device for the respective switches comprises a pair of brackets 83, arranged in alignment with the arms 79 of the switches 77 and 78 and mounted at the front and back, respectively, of the lens carrier 20. Threaded into each bracket 83 is a contact screw 84, the head of which is adapted to abut against the switch at the corresponding side of the lens carrier when the latter reaches the end of its range of movement toward the last-named switch. By threaded adjustment of the contact screws 84 in their respective brackets 83, the range of effective movement of the primary lens 19 and correspondingly the range of magnification permitted may be varied.

Movement of the primary lens in the manner described coincidentally shifts the secondary lens carrier 22 to a compensating degree so as to maintain the pre-adjusted critical focus at all times. This result is obtained incident to the movement of the cam plate 35 on its pivot in accordance with the progressively changing position of the roller 41 and the tension of the spring 46, as hereinabove described.

As the degree and velocity of movement of the secondary lens carrier 22 varies with the contour of the cam 42, the latter may be changed to assure a movement in the secondary lens which conforms to the optical characteristics of the lens employed. The fixing of the contour of the cam 42 is most easily accomplished by loosening the screws 44 and focusing the lens system upon a distant object with the primary lens 19 located at one end of its range of movement. After tightening the screw 44 located directly above the roller 41, with the parts in these positions, the primary lens is shifted to place the roller adjacent the second screw 44 and the lens system again focused whereupon the screw adjacent the roller 41 is tightened. In a similar manner the positions of successive sections of the cam 42 are established and the entire contour fixed. While the relative ranges of movement of the primary and secondary lenses vary substantially with changes in object distance, variation in the contour of the cam 42 is not required where the same lens combination is employed. In the present invention, different patterns of movement for the respective lens carriers 20 and 22 for different object distances are established by shifting the cam plate on its pivot relative to the bar 26, so as to vary the angular disposition of the cam relative to the line of movement of the cam follower 41. This operation is effected by loosening the clamping screws 48 and rotating the shaft 38, with which may be associated an index scale (not shown) for indicating the required adjustments for various object distances.

While the primary and secondary lenses are normally shifted in response to the drive of the motor 49 they may be variously adjusted manually throughout the same relative ranges of movement by a long push rod 85 having one end threaded into the block 60 and extending rearwardly parallel to and spaced slightly above the base 10 for projection through the frame of the camera (not shown) with which the lens system is used. The rearward end of the rod 85 terminates at the back of the camera and may be equipped with a knob or handle (not shown) for facile manual reciprocation of the rod and corresponding adjustment of the primary lens so as to effect the required variation of the magnification of the image and, through the cam mechanism, coincident focusing adjustment of the secondary lens. It will be appreciated that in order to permit manual adjustment of the lens system, the thumb screw 59 is first disengaged from the block 60 so as to operatively disassociate the member 57 and the primary lens carrier.

While I have illustrated a preferred embodiment of the invention, it will be understood that the box frame and lens assembly may be constructed for joint removal from the camera when its use is not required, that any conventional transmission means may be substituted for the worm drive connected between the motor 49 and primary lens carrier 20, that friction drive means may displace the various racks and pinions, and that numerous changes may be made in size, design, shape, number and proportion of the various parts, without departing from the spirit of my invention as defined by the appended claims.

What I claim and desire to secure by Letters Patent is:

1. In a lens adjusting mechanism, a base, a pair of lens carriers, a primary lens and a secondary lens mounted in said carriers, respectively, means to support said primary and secondary lens carriers for coaxial movement of said lenses over said base, a motor carried by said base, means actuated by said motor to shift said carriers and lenses coaxially relative to one another, and means actuated by said carriers to stop said motor at the end of a pre-determined range of movement of said carriers.

2. In a lens adjusting mechanism, a base, a primary lens and a secondary lens, means to support said lenses upon said base for relative coaxial movement, an electric motor, means including a switch controlling the operation of said motor, means actuated by said motor to shift said primary lens axially, means, including cam mechanism, actuated in response to movement of said primary lens, to shift said secondary lens axially, and means to open said switch operable at the end of a pre-determined range of movement of said primary lens.

3. In a lens adjusting mechanism, a base, a primary lens and a secondary lens, means to support said lenses upon said base for relative coaxial movement, an electric motor, means including a switch controlling the operation of said motor, means actuated by said motor to shift said primary lens axially, means, including cam mechanism, actuated in response to movement of said primary lens, to shift said secondary lens axially, and means carried by said primary lens to open said switch at the end of a pre-determined range of movement of said primary lens.

4. In a lens adjusting mechanism, a base, a primary lens and a secondary lens, means to support said lenses upon said base for relative coaxial movement, an electric motor, means including a switch controlling the operation of said motor, means actuated by said motor to shift said primary lens axially, means actuated in response to movement of said primary lens to shift said secondary lens axially, said means including a cam plate and a cam mounted upon said plate, means to open said switch operable at the end of a pre-determined range of movement of said primary lens, and means to secure said cam plate in each of different positions relative to said base to provide different patterns of relative movement of said primary and secondary lenses.

5. In a lens adjusting mechanism, a supporting plate, a base normally carried by said supporting plate, a pair of lens elements, means to slidably support said lens elements upon said base for relative coaxial movement, an electric motor, an electrical system comprising a plug and receptacle operatively engaged upon assembly of said base with said supporting plate, to supply electrical energy to said motor, and means, actuated by said motor, to shift each of said lens elements relative to said base, and an electrical switch in said electrical system actuated by one of said lens elements to deenergize said motor.

6. In a lens adjusting mechanism, a base, a pair of guide rods carried by said base in spaced, parallel relationship, lens carriers slidably mounted upon said guide rods for relative coaxial movement, a primary lens and a secondary lens mounted in said carriers, respectively, a motor, means to mount said motor below said base, a worm rotated by said motor and journalled upon said base in axially parallel relationship with the axis of said lenses, a worm follower encircling said worm, a releasable attaching device to connect said follower to said primary lens carrier, a rod connected to said primary lens carrier to shift said primary lens along said guide rods upon release of said attaching device, and cam mechanism actuated in response to movement of said primary lens to shift said secondary lens carrier axially.

7. In a lens adjusting mechanism, a base, a pair of guide rods carried by said base in spaced, parallel relationship, lens carriers slidably mounted upon said guide rods for relative coaxial movement, a primary lens and a secondary lens mounted in said carriers, respectively, a motor, means to mount said motor below said base, an actuating element movable above said base in a direction parallel to the axis of said lenses in response to energization of said motor, a releasable attaching device to connect said actuating element to said primary lens carrier, a rod connected to said primary lens carrier, extending parallel to the optical axis and beneath said secondary lens, to shift said primary lens along said guide rods upon release of said attaching device, and means to shift said secondary lens carrier along said guide rods synchronously with the movement of said primary lens.

8. In a lens adjusting mechanism for a camera, a base disposed at the front of the camera, a pair of guide rods carried by said base is spaced, parallel relationship, lens carriers slidably mounted upon said guide rods for relative coaxial movement, a primary lens and a secondary lens mounted in said carriers, respectively, an electric motor, means to mount said motor below said base, power transmitting means actuated by said motor to shift said primary lens carrier on said guide rods, means, comprising cam mechanism to shift said secondary lens carrier on said guide rods, actuated in response to movement of said primary lens carrier, an electrical system to supply electrical energy to said motor, and a switch in said electrical system disposed at the back of the camera to control operation of said motor.

9. In a lens adjusting mechanism for a camera, a base disposed at the front of the camera, a pair of guide rods carried by said base in spaced, parallel relationship, lens carriers slidably mounted upon said guide rods for relative coaxial movement, a primary lens and a secondary lens mounted in said carriers, respectively, an electric motor, means to mount said motor below said base, power transmitting means actuated by said motor to shift said primary lens carrier on said guide rods, means, comprising cam mechanism to shift said secondary lens carrier on said guide rods, actuated in response to movement of said primary lens carrier, an electrical system to supply electrical energy to said motor, and a rheostat in said electrical system, disposed at the back of the camera, to vary the velocity of said motor.

JOSEPH B. WALKER.

REFERENCES CITED

The following references are of record in the file of this patent:

UNITED STATES PATENTS

| Number | Name | Date |
|---|---|---|
| 1,174,547 | Clason | Mar. 7, 1916 |
| 1,755,105 | Douglass | Apr. 15, 1930 |
| 1,790,232 | Flora | Jan. 27, 1931 |
| 1,898,471 | Walker | Feb. 21, 1933 |
| 2,165,341 | Capstaff et al. | July 11, 1939 |
| 2,364,837 | Williams | Dec. 12, 1944 |